United States Patent [19]

Dall et al.

[11] 4,074,594
[45] Feb. 21, 1978

[54] ROTARY CUTTER FOR AGGLOMERATED FOAM PLASTIC

[75] Inventors: Arthur G. Dall; Donald L. Morgan, both of Jasper, Ind.

[73] Assignee: North American Products Corporation, Atlanta, Ga.

[21] Appl. No.: 760,946

[22] Filed: Jan. 21, 1977

[51] Int. Cl.² .................. B21K 21/00; B26D 1/12; B27G 13/00
[52] U.S. Cl. .................. 76/101 A; 144/230; 241/294; 407/61; 407/58
[58] Field of Search .......... 29/103 R, 105 R; 144/226, 227, 230, 232, 236; 241/221, 222, 294; 157/13; 76/101 A

[56] References Cited

U.S. PATENT DOCUMENTS

| 417,776 | 12/1889 | Eynon | 29/105 R |
|---|---|---|---|
| 2,265,643 | 12/1941 | Heath | 29/105 R |
| 2,396,289 | 3/1946 | Ross | 29/105 R |
| 2,840,127 | 6/1958 | Stokes et al. | 241/294 X |
| 2,986,347 | 5/1961 | Stevenson | 241/294 X |
| 3,776,289 | 12/1973 | Boboltz et al. | 144/230 |

FOREIGN PATENT DOCUMENTS

| 1,455,182 | 6/1965 | France | 29/105 R |
|---|---|---|---|
| 23,563 | 10/1907 | United Kingdom | 29/105 R |
| 672,117 | 5/1952 | United Kingdom | 29/105 R |
| 425,583 | 10/1974 | U.S.S.R. | 241/221 |

*Primary Examiner*—Harrison L. Hinson
*Attorney, Agent, or Firm*—Ira Milton Jones & Associates

[57] ABSTRACT

A rotary cutter, in the nature of a milling cutter, especially for agglomerated foam plastic, has a body with a concentric surface of revolution onto which are brazed block-like carbide cutting elements. The cutting edges of circumferentially adjacent cutting elements lie on lines spaced apart circumferentially by between 0.60 in. (15 mm.) and 0.165 in. (17 mm.), and the kerfs of such cutting elements overlap. The cutting elements are received in shallow axially extending grooves in the body; their axial locations are established by reference to lines scribed around the body at uniform axial intervals.

5 Claims, 3 Drawing Figures

ROTARY CUTTER FOR AGGLOMERATED FOAM PLASTIC

This invention relates to cutters for substantially hard plastic foam material such as cellular polystyrene or agglomerated plastic foam; and the invention is more particularly concerned with a rotatable cutter, generally on the order of a milling cutter, for imparting a predetermined profile to a surface on a workpiece of hard foam material.

When a piece of hard plastic foam material is cut by means of a rotary cutter to provide the piece with a desired profile on one surface thereof, the cuttings removed from the piece are desirably collected for reuse. Such collection is ordinarily accomplished by means of a suction nozzle mounted near the cutter, by which the chips are drawn away from the work zone as fast as they are produced.

In order to ensure efficient operation of the suction collector and economical recycling of the removed material, the cutter should produce chips that are of a fairly uniform size and are neither too small nor too large. Small, powder-like or dust-like cuttings are difficult to pick up with a suction nozzle. Very large chips are not necessarily undesirable from the standpoint of removal or economical recycling, but their production signifies that the cutting tool is taking an excessively large bite and is therefore likely to be producing a crushed or ragged finish on the surface.

Of course any cutter used on foam plastic should also be capable of a high feed rate, and it should remain cool while cutting so that it does not heat the workpiece to the melting temperature of the material, which is relatively low.

One type of cutter that has heretofore been in commercial use has a body which is formed as a surface of revolution (cylinder, conical frustum, vase-shape or the like) and has integral, grater-like teeth that are upset from the curved body surface like the teeth of a rasp. The body is made of aluminum so that the teeth can be easily formed, and therefore the teeth are relatively soft. As a result, the teeth lose their cutting edges after a comparatively short useful life. Resharpening of that prior cutter is said to be feasible, but because of the shape of its teeth, resharpening is obviously a time-consuming process that requires a rather high degree of skill.

By contrast, it is an object of the present invention to provide a rotary cutter for agglomerated plastic foam, in the nature of a milling cutter, which cutter has its cutting edges formed on cutting elements of very hard material and therefore maintains sharpness through an extremely long useful life.

Another object of this invention is to provide an easily manufactured cutter of the character described that is capable of being quickly and easily resharpened, produces chips of a uniform size suitable for economical suction collection and reclamation, and operates at a high feed rate without any tendency to heat objectionably.

Another object of this invention is to provide a simple and inexpensive method of producing milling cutters that are suitable for cutting various materials and particularly agglomerated foam plastic.

With these observations and objectives in mind, the manner in which the invention achieves its purpose will be appreciated from the following description and the accompanying drawing, which exemplify the invention, it being understood that changes may be made in the specific apparatus disclosed herein without departing from the essentials of the invention set forth in the appended claims.

The accompanying drawing illustrates one complete example of an embodiment of the invention constructed according to the best mode so far devised for the practical application of the principles thereof, and in which.

Figure 1:
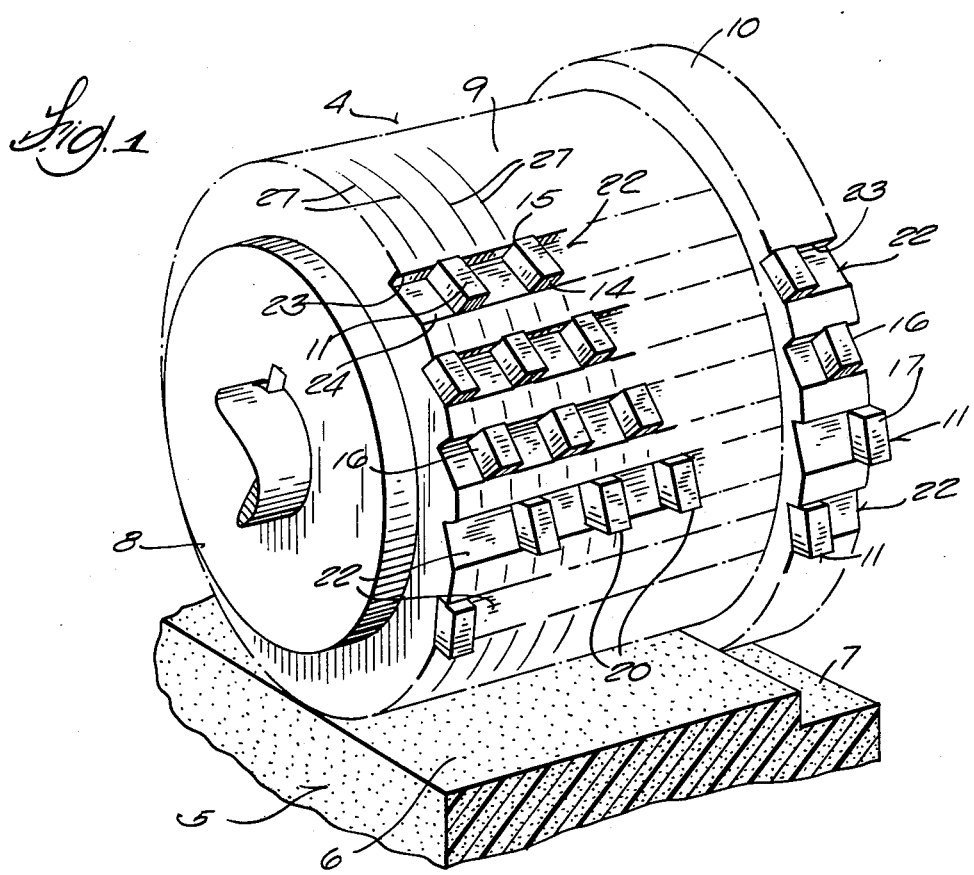
FIG. 1 is a perspective view of a cutter embodying the principles of this invention, shown in operative relationship to a workpiece having a surface which is to be brought to a desired profile by means of the cutter.

Referring now to the accompanying drawing, the numeral 4 designates generally a cutter which embodies the principles of this invention and which is intended to produce a desired profile on one surface of a workpiece 5 of agglomerated foam plastic or the like. The particular cutter 4 that is illustrated in FIG. 1 is intended to produce a surface profile that is generally flat across most of its width, as denoted by 6, but which has a notch or cutout 7 extending along one edge thereof. Thus the body 8 of the cutter 4 is cylindrical and of uniform diameter along most of its length, as denoted by 9, but it has an axially short, larger diameter cylindrical portion 10 at one end thereof by which the notch 7 in the workpiece is formed.

If a curved profile were desired on the workpiece surface to be finished, the cutter body 8 would be correspondingly curved in profile as viewed from its side, and would thus have a varying diameter along its length. In every case, the body will be substantially circular on every plane normal to its axis, so that the curved body surface could be said to be a surface of revolution. While depicted as solid, the body could be hollowed out for lightness; and making it hollow would be advantageous in some cases inasmuch as the body is preferably made of steel.

The cutting edges of the cutting 4 are formed on block-like cutting elements 11 of a hard metal, bonded to the body 8 as by brazing. Preferably the cutting elements 11 are of carbide stock conventionally used for the tooth tips of heavy duty saws and similar tools, and therefore when the cutter 4 is used for cutting such easily worked material as foam plastic it has an extremely long useful life before needing resharpening.

The cutting elements 11 are identical rectangular blocks, each having opposite front and rear faces 14 and 15, respectively, opposite side faces 16, and opposite top and bottom faces 17 and 18, respectively. As mounted on the body, each cutting element has its front face 14 facing substantially circumferentially in the direction in which the cutter is intended to rotate. The bottom face 18 of each cutting element is bonded to the body, and its top face 17 faces substantially radially outwardly. The top and front faces meet at a cutting edge 20, and the cutting element is disposed in such an orientation on the body that its top face 17 is relieved radially inwardly back of that cutting edge, as more fully explained hereinafter.

When the body is of substantial axial length, as in the case of the smaller diameter portion 9 of the cutter body shown in FIG. 1, the cutting elements 11 are arranged in axially extending ranks, with the several cutting elements in each rank spaced at uniform distances from one another. In every case, each cutting element is offset axially relative to its circumferentially adjacent cutting elements. The amount of this offset is such that the kerf of each cutting element slightly overlaps that of at least one circumferentially adjacent cutting element. The amount of such axial offset is uniform from rank to rank, and is always in one axial direction through a set of successive cutting elements in one circumferential direction, so that on an axially long cutter the files of cutting elements appear to extend around the body helically.

To provide for secure bonding of the cutting elements 11 to the body 8, and also to facilitate proper location and orientation of the cutting elements on the body, axially extending V-shaped grooves 22 are formed in the curved surface of the body at uniform circumferential intervals around it. Preferably these grooves extends parallel to the body axis; that is, each of them lies on a plane which also contains the body axis. However, the grooves could also curve helically around the body, although it would complicate manufacture to so form them. In any case, there must be uniform circumferential distances between the grooves.

Figure 3:
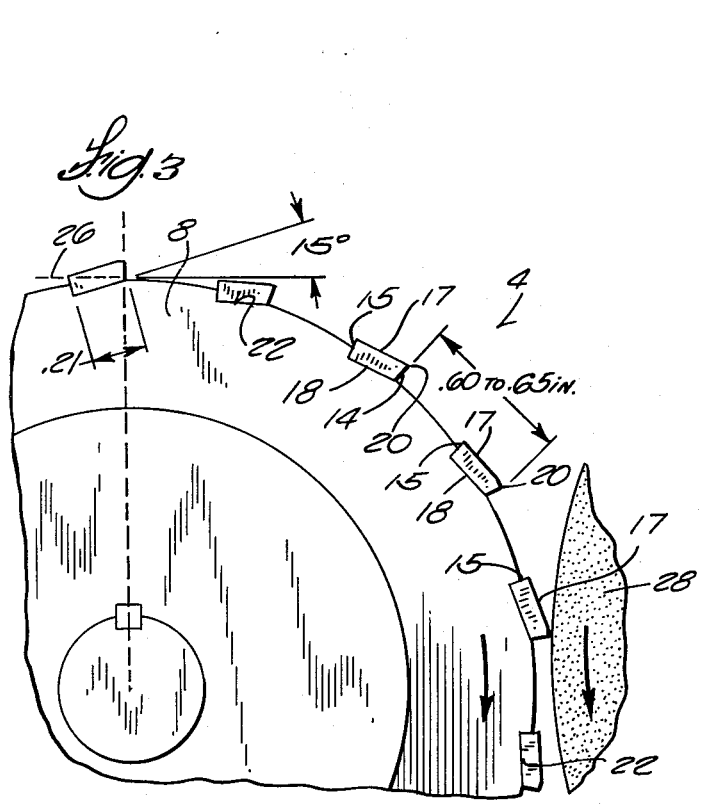
FIG. 3 is a more or less diagrammatic fragmentary view in end elevation, showing the cutter in operative relationship to a grinding wheel by which the cutting elements on the cutter are dressed and sharpened.
Figure 2:
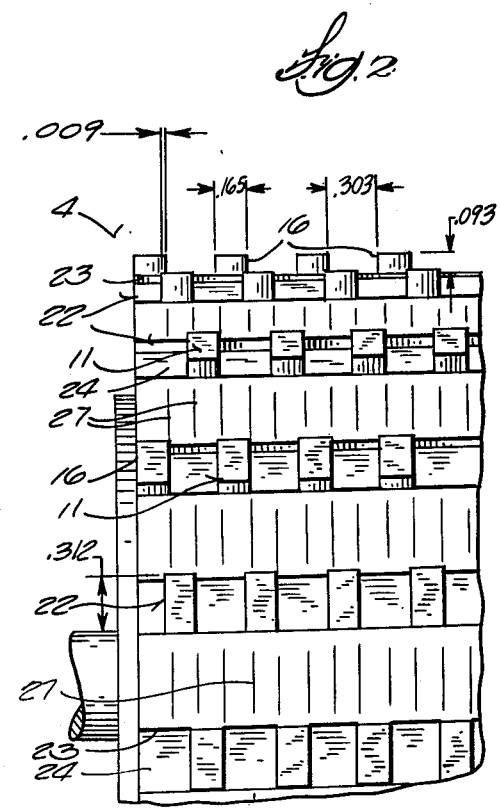
FIG. 2 is a fragmentary view of the cutter in side elevation.

Each groove defines a flat surface 23 on the body that faces substantially circumferentially in the direction in which the cutter is intended to rotate and another flat surface 24 that faces substantially radially outwardly. Inasmuch as the cutting elements will normally be perfectly rectangular, the two surfaces 23 and 24 of each groove will be at 90° to one another, and the bottom face 18 of each cutting element will flatwise overlie the radially outwardly facing surface 24 of a groove while the rear face 15 of the cutting element abuts the circumferentially facing surface 23 of that groove. So that the cutting elements will be oriented in a manner to provide the above mentioned relief of their top surfaces 17, each groove has its radially outwardly facing surface 24 disposed at an acute angle to a plane 26 which is tangent to the body on a radial through the body axis and the circumferentially facing surface 23 of that groove. Specifically, as shown in FIG. 3, the radially facing surface 24 lies at an angle of about 15° to the plane just mentioned.

For optimum chip size, it has been found that the circumferential distance between the cutting edges 20 of circumferentially adjacent cutting elements is rather critical and should be within the range of substantially 0.60 in. (15 mm.) to 0.65 in. (17 mm.). With identical, relatively small rectangular cutting elements, this distance between circumferentially adjacent cuttinhg edges is only very slightly greater than the distance between the circumferentially facing surfaces 23 of circumferentially adjacent grooves 22. Consequently, the number of grooves 22 around the body must be such that the groove-to-groove spacing will be substantially within the range just specified. However, the number of grooves must also be such that the cutting elements can cooperate in like sets, each set consisting of a certain number of cutting elements located in circumferentially adjacent grooves and axially offset in one direction in relation to one another. In the preferred case, as illustrated, the cutting elements cooperate in sets of three, and therefore the number of grooves around the body must be an integral multiple of three.

By way of specific example, if a cutter has a body diameter of 6.75 in., it would be provided with 36 grooves, at uniform circumferential intervals of 0.59 in. A cutter having a body diameter of 7.6 in. (to provide a cutting edge diameter of 7.75 in.) would have 39 grooves, spaced apart circumferentially by 0.61 in.

For optimum chip size and lowest cost of the finished cutter, the cutting elements can be the smallest standard carbide elements intended for tooth tips on saws and the like. Such carbide blocks measure 0.093 in. by 0.312 in. by 0.165 in., and they are preferably mounted on the body with their longest (0.312 in.) dimension extending circumferentially and their smallest (0.093 in.) dimension extending radially. Each cutting element therefore has a cutting edge which is 0.165 in. long, extending parallel to the cutter axis.

With cutting elements having these dimensions, each cutting element can be axially offset from a circumferentially adjacent cutting element by about 0.156 in., so that the kerfs of circumferentially adjacent cutters overlap one another by about 0.009 in.

With the cutting elements cooperating in sets of three, as is preferred, cutting elements in every third groove around the body are coplanar with one another. Hence, three cutting elements that are circumferentially adjacent to one another follow in the kerf of a similar three cutting elements that are immediately ahead of them in the direction of cutter rotation. It will be understood, however, that the sets of cutting elements are not distinguishable as such when an axially long cutter is viewed as a whole (as on the smaller diameter body portion 9 of the cutter 5 shown in FIG. 1), inasmuch as the several cutting elements 11 in each groove 22 are spaced apart at uniform distances, and circumferentially adjacent cutting elements have uniform axial offsets. Specifically, axially adjacent cutting elements in each groove 22 are spaced apart by a little less than twice the width of a cutting element, e.g. by 0.303 in. in the specific example here used.

In making a cutter of this invention, the body is first formed to the proper shape, as by turning it on a lathe, and then marks 27 are made on the body that define the locations of the several cutting elements 11 axially on the body. These marks can be scribed with the use of a lathe cutter so that each extends circumferentially entirely around the body and lies in a plane normal to the body axis. The marks 27 are of course spaced apart at uniform axial intervals along the body. For a cutter having cutting elements of the specific size and spacing hereinabove described, the marks can be spaced apart by 0.156 in.

The axially extending grooves 22 that receive the cutting elements can be milled or ground in the body either before of after the marks 27 are scribed.

The cutting elements 11 are brazed in place in the grooves 22, using the marks 27 for guidance in locating them on the body.

As a result of the brazing operation and other factors, it can be expected that the cutting edges 20 of the several cutting elements will be at very slightly differing distances from the body axis. To correct this condition, the cutting elements are spin ground as illustrated in FIG. 3; that is, the body is confined to rotation about its axis while a grinding wheel 28 which is also rotating about a substantially fixed axis is engaged with the cutting elements to dress their top surfaces adjacent to their front surfaces. The spin grinding operation is continued until about 75% of the cutting elements have been dressed to concentricity. At that point the difference in radius between the cutting edges of the dressed and the undressed cutting elements will be inconsequential.

It will be evident that when the cutting edges 20 have become dull, through very long continued use of the cutter, resharpening can be quickly and easily effected by means of another spin grinding operation. It will also be apparent that in case of necessity individual cutting elements can be readily replaced.

From the foregoing description and the accompanying drawings it will be readily apparent that the present invention provides an inexpensive and durable rotary cutter, in the nature of a milling cutter, that is especially well suited for cutting agglomerated foam plastic, and that the invention also provides a simple and easily practiced method of manufacturing such a cutter.

Those skilled in the art will appreciate that the invention can be embodied in forms other than as herein disclosed for purposes of illustration.

The invention is defined by the following claims.

We claim:

1. The method of making a cutter which is rotatable in one direction for imparting a predetermined profile to a surface on a workpiece, which method comprises:
   A. providing a plurality of substantially identical block-like cutting elements of hard metal, each having opposite front and rear end faces, opposite side faces, and opposite top and bottom faces;
   B. forming a body having an axis and having an axially extending surface which is substantially circular and concentric to said axis on every plane normal thereto;
   C. delineating on said surface of said body marks which define the intersections with said surface of a series of planes which are normal to said axis and are spaced apart by uniform distances slightly less than the width of a cutting element as measured between its side faces;
   D. forming axially extending shallow grooves in said body that open to its said surface and are substantially V-shaped in cross-section, each of said grooves having
      (1) one surface which faces in said direction of rotation and lies substantially on a radial plane that also contains said axis,
      (2) the other surface of each groove being substantially normal to said one groove surface, said grooves being arranged at uniform circumferential intervals around the body;
   E. by reference to said marks, bonding said cutting elements to the body in said grooves,
      (1) with each cutting element having its rear face substantially flatwise engaging said one surface of a groove, and
      (2) its bottom face flatwise overlying said other surface of the same groove, and
      (3) with all of said cutting elements in a consistent relationship to the planes defined by said marks such that every cutting element is in axially offset relationship to at least one circumferentially adjacent cutting element and has its kerf in slightly overlapping relationship to the kerf of said circumferentially adjacent cutting element; and
   F. with the body confined to rotation about its axis, grinding the top faces of cutting elements adjacent to their front faces, to define cutting edges on the several cutting elements and to cause each set of said cutting edges that extend across a common plane normal to said axis to be spaced at a substantially uniform distance from said axis.

2. The method set forth in claim 1 wherein:
   G. said grooves formed in the body are arranged at such circumferential intervals therearound that
      (1) the number of such grooves is an integral multiple of three, and
      (2) the value of said multiple is such that the circumferential distances from said one surface of each groove to the corresponding surface of each of its adjacent grooves is substantially between 0.60 in. (15 mm.) and 0.65 in. (17 mm.); and
   H. cutting elements in every third one of said grooves around the body are coplanar with one another.

3. The method of making a cutter which is rotatable in one direction for imparting a predetermined profile to a surface on a workpiece, which method comprises:
   A. providing a plurality of substantially identical block-like cutting elements of hard metal, each having
      (1) opposite front and rear end faces,
      (2) opposite top and bottom faces, and
      (3) opposite side faces;
   B. forming a body having an axis and having an axially extending surface which is substantially circular and concentric to said axis on every plane normal thereto;
   C. delineating on said surface of said body marks which define the intersections with said surface of a series of planes which are normal to said axis and are spaced apart by uniform distances slightly less than said width;
   D. forming axially extending shallow grooves in said body that open to its said surface and are substantially V-shaped in cross-section,
      (1) each of said groooves having one surface which faces in said one direction of rotation and lies substantially on a radial plane that also contains said axis,
      (2) the other surface of each groove being substantially normal to said one groove surface,
      (3) said grooves being arranged at uniform circumferential intervals around the body;
   E. by reference to said marks, bonding said cutting elements to the body in said grooves, p2 (1) with each cutting element having its rear face abutting said one surface of a groove and
      (2) its bottom face flatwise overlying said other surface of the same groove, and
      (3) with every cutting element offset axially from one of its circumferentially adjacent cutting elements; and
   F. with the body confined to rotation about its axis, grinding the top faces of cutting elements, to define cutting edges on the several cutting elements and to cause cutting edges on the cutting elements that are coplanar with one another to be spaced at a substantially uniform distance from said axis.

4. The method of making a cutter which is rotatable in one direction for imparting a predetermined profile to a surface on a workpiece, which method comprises:
   A. forming a body having an axis and having an axially extending outer surface which is substantially circular and concentric to said axis on every plane normal thereto;

B. forming in said outer surface of the body shallow grooves which extend substantially axially and are spaced apart by uniform circumferential distances, each of said grooves having
   (1) one substantially flat surface which faces substantially in said direction of rotation, and
   (2) another substantially flat surface that faces radially outwardly and extends in said direction of rotation from said one substantially flat surface to said outer surface, said other substantially flat surface being nearer the axis of the body at its junction with said one flat surface than at its junction with said outer surface;
C. providing a plurality of substantially identical block-like cutting elements of hard metal, each having opposite front and rear end faces, opposite side faces, and opposite and substantially parallel top and bottom faces;
D. bonding said cutting elements to the body in said grooves,
   (1) with each cutting element having its rear face substantially flatwise engaging said one surface of a groove and its bottom face engaging said other face of a groove,
   (2) with the several cutting elements in each groove spaced apart along the length of the groove, and
   (3) with the cutting element in adjacent grooves in axially offset relationship to one another; and
E. with the body confined to rotation about its axis, grinding the top faces of cutting elements adjacent to their front faces, to define cutting edges on the several cutting elements and to cause the cutting edges of those cutting elements that are on a common plane normal to said axis to be spaced at a substantially uniform distance from said axis.

5. The method of claim 4, further characterized by:
before bonding the cutting elements to the body, delineating on said outer surface of the body marks that define the intersection with said outer surface of a series of planes which are normal to said axis and are spaced apart by uniform distances slightly less than the width of a cutting element as measured between its side faces, which marks can be employed to establish the positions of the several cutting elements along the axial dimension of the body.

* * * * *